United States Patent
Zheng et al.

(10) Patent No.: US 11,416,208 B2
(45) Date of Patent: Aug. 16, 2022

(54) AUDIO METADATA SMOOTHING

(71) Applicant: Netflix, Inc., Los Gatos, CA (US)

(72) Inventors: Weiguo Zheng, San Jose, CA (US);
Rex Ching, San Ramon, CA (US);
Weibo Ni, Campbell, CA (US);
Kensuke Miyagi, Los Gatos, CA (US);
Sean Munday, San Jose, CA (US);
Teresa Tao, Cupertino, CA (US)

(73) Assignee: Netflix, Inc., Los Gatos, CA (US)

( * ) Notice: Subject to any disclaimer, the term of this patent is extended or adjusted under 35 U.S.C. 154(b) by 108 days.

(21) Appl. No.: 15/931,442

(22) Filed: May 13, 2020

(65) Prior Publication Data
US 2021/0089259 A1    Mar. 25, 2021

Related U.S. Application Data

(60) Provisional application No. 62/904,542, filed on Sep. 23, 2019.

(51) Int. Cl.
*G06F 3/16* (2006.01)

(52) U.S. Cl.
CPC .................. *G06F 3/165* (2013.01)

(58) Field of Classification Search
CPC ........................ G06F 3/165; G06F 3/16–165
USPC ......................................................... 700/94
See application file for complete search history.

(56) References Cited

U.S. PATENT DOCUMENTS

| | | | |
|---|---|---|---|
| 10,409,546 B2 * | 9/2019 | Zalon | G06F 3/165 |
| 2010/0042740 A1 * | 2/2010 | Bhattacharya | H04B 14/04 |
| | | | 709/231 |
| 2010/0272290 A1 * | 10/2010 | Carroll | H03G 3/3089 |
| | | | 381/107 |
| 2011/0040397 A1 * | 2/2011 | Kraemer | G10L 19/167 |
| | | | 700/94 |
| 2012/0232910 A1 * | 9/2012 | Dressier | G10L 19/008 |
| | | | 704/500 |
| 2013/0042015 A1 * | 2/2013 | Begen | H04N 19/46 |
| | | | 709/231 |
| 2014/0275851 A1 * | 9/2014 | Amble | A61B 5/7425 |
| | | | 600/301 |
| 2017/0094409 A1 * | 3/2017 | Baumgarte | G10L 19/167 |
| 2017/0243595 A1 * | 8/2017 | Kjoerling | H04N 21/23418 |
| 2017/0293460 A1 * | 10/2017 | Brown | G06F 3/165 |

* cited by examiner

*Primary Examiner* — Hemant S Patel
(74) *Attorney, Agent, or Firm* — FisherBroyles, LLP

(57) ABSTRACT

The disclosed computer-implemented method for smoothing audio gaps using adaptive metadata identifies an initial audio segment and a subsequent audio segment that follows the initial audio segment. The method accesses a first set of metadata that corresponds to a last audio frame of the initial audio segment and accesses a second set of metadata that corresponds to the first audio frame of the subsequent audio segment. The first and second sets of metadata include audio characteristic information for the two audio segments. The method then generates a new set of metadata that is based on both sets of audio characteristics. The method further inserts a new audio frame between the last audio frame of the initial audio segment and the first audio frame of the subsequent audio segment and applies the new set of metadata to the new audio frame. Various other methods, systems, and computer-readable media are also disclosed.

20 Claims, 12 Drawing Sheets

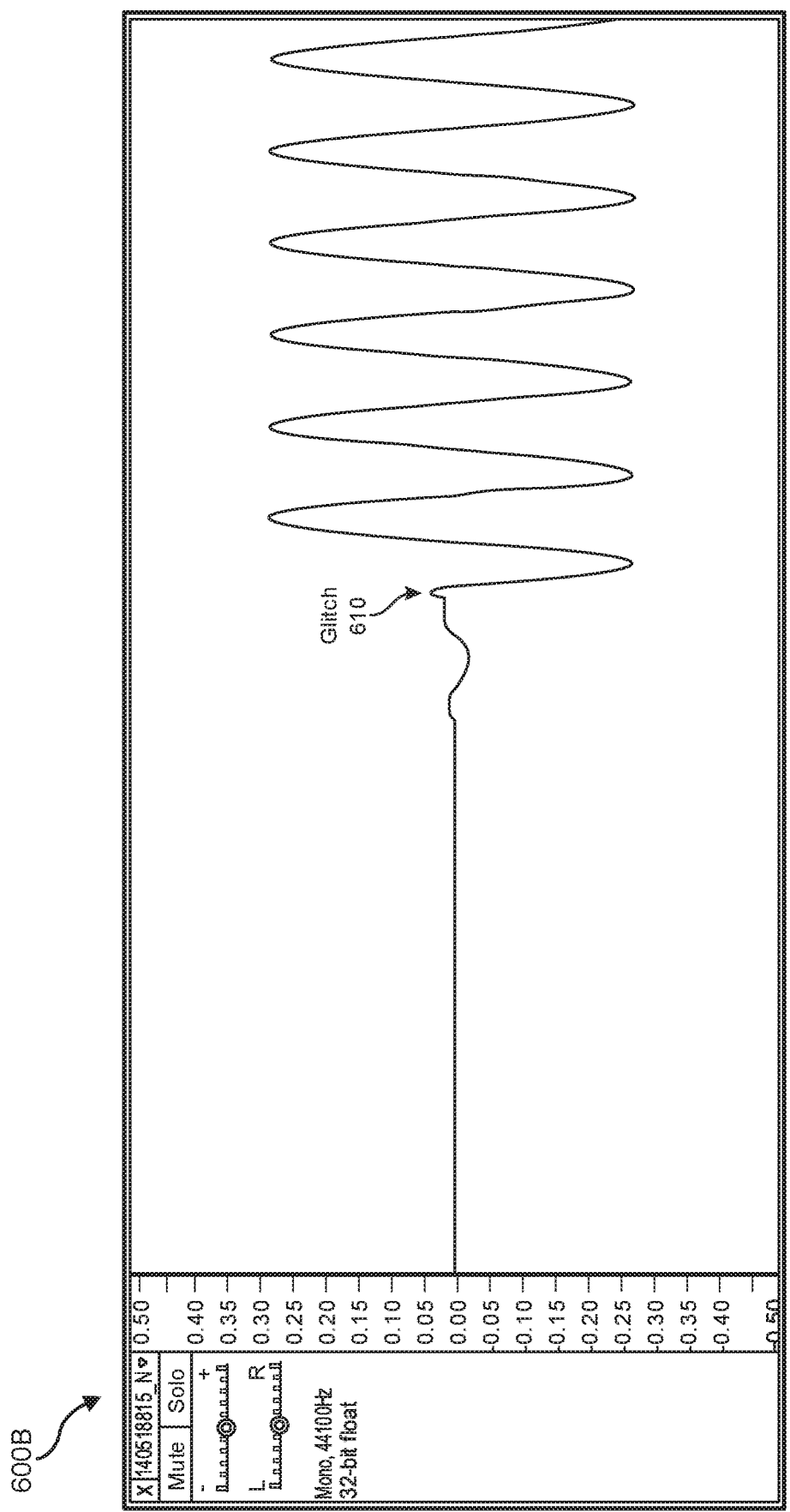

AUDIO METADATA SMOOTHING

CROSS REFERENCE TO RELATED APPLICATION

This application claims priority to and the benefit of U.S. Provisional Application No. 62/904,542, filed Sep. 23, 2019, the disclosure of which is incorporated, in its entirety, by this reference.

BACKGROUND

Normally, when a media item is being presented to a user, the audio and video are aligned, creating a seamless representation of the underlying media item. In some instances, however, the audio and video may be misaligned. This misalignment may result in glitches that are audible and are disruptive to the viewer. For example, in the case of an interactive movie, where a viewer can select different paths through the movie, playback of that movie may skip from one part of the movie to another part. During this skipping process, however, the audio and video may become misaligned. Or, in other cases, the audio settings at one location in the movie may not be the same as the audio settings at a different location in the movie. In such cases, the user may hear an audible glitch when skipping to other parts of the interactive movie.

SUMMARY

As will be described in greater detail below, the present disclosure describes methods and systems for smoothing audio gaps that occur when two different segments of audio are joined together or when a transition occurs between two different audio segments.

In one example, a computer-implemented method for smoothing audio gaps using adaptive metadata includes identifying, within a media item that includes multiple audio segments, an initial audio segment and a subsequent audio segment that follows the initial audio segment. The method next includes accessing a first set of metadata that corresponds to a last audio frame of the initial audio segment. The first set of metadata includes information indicating audio characteristics of the last audio frame of the initial audio segment. The method further includes accessing a second set of metadata that corresponds to the first audio frame of the subsequent audio segment. The second set of metadata includes information indicating audio characteristics of the first audio frame of the subsequent audio segment. The method also includes generating, based on the first and second sets of metadata, a new set of metadata that is based on both the audio characteristics of the last audio frame in the initial audio segment and the audio characteristics of the first audio frame in the subsequent audio segment. The method then includes inserting at least one new audio frame between the last audio frame of the initial audio segment and the first audio frame of the subsequent audio segment, and applying the new set of metadata to the new audio frame.

In some embodiments, the initial audio segment and the subsequent audio segment are part of the same media item. In some cases, the media item is an interactive media item that allows out-of-order playback of audio segments. In some cases, the subsequent audio segment is an out-of-order audio segment within the media item. In some examples, the initial audio segment and the subsequent audio segment are each part of different media items that are being spliced together.

In some examples, the generated new portion of metadata includes adaptive metadata configured to adapt to the audio characteristics of the last audio frame in the initial audio segment and to the audio characteristics of the first audio frame in the subsequent audio segment. In some embodiments, the new audio frame includes at least two sub-portions over which the audio characteristics of the last audio frame in the initial audio segment are transitioned to the audio characteristics of the first audio frame in the subsequent audio segment using the adaptive metadata. In some cases, the new audio frame includes at least two new audio frames over which the audio characteristics of the last audio frame in the initial audio segment are transitioned to the audio characteristics of the first audio frame in the subsequent audio segment using the adaptive metadata.

In some embodiments, the adaptive metadata is dynamically inserted into a string of inserted audio frames until the first audio frame of the subsequent audio segment is reached. In some examples, the number of inserted audio frames having adaptive metadata depends on the length of time between playback of the last audio frame in the initial audio segment and the first audio frame in the subsequent audio segment. In some cases, the adaptive metadata is applied over a specified minimum number of audio frames.

In some examples, the initial audio segment and the subsequent audio segment are inserted into a pass-through device. In some embodiments, the insertion into a pass-through device includes the following: copying the first metadata into a silent audio frame, inserting the silent audio frame after the last audio frame of the initial audio segment, copying the first metadata into a pre-encoded user interface audio segment having one or more audio frames, inserting the pre-encoded user interface audio segment, inserting the silent audio frame after the inserted pre-encoded user interface audio segment and removing a specified number of audio frames from the subsequent audio segment to maintain audio/video synchronization.

In some cases, the method further includes detecting that playback of the initial audio segment or the subsequent audio segment has been directed to stop, halting playback of the initial audio segment or the subsequent audio segment at a specified position, where the initial audio segment or the subsequent audio segment have a current sound pressure level, and appending one or more audio frames to the initial audio segment or the subsequent audio segment after the specified position, where the appended audio frames include adaptive metadata that gradually reduces the current sound pressure level to a specified sound pressure level.

In some examples, the method further includes detecting that playback of the initial audio segment or the subsequent audio segment has been directed to start, initiating playback of the initial audio segment or the subsequent audio segment at a specified position, where the initial audio segment or the subsequent audio segment have a current sound pressure level, and inserting one or more audio frames at the specified position before the initial audio segment or the subsequent audio segment are played back, where the appended audio frames include adaptive metadata that gradually increases the current sound pressure level to a specified sound pressure level.

In some embodiments, the method further includes detecting a gap length in time between playback of the initial audio segment and playback of the subsequent audio segment. In some examples, the method further includes calculating the number of audio frames that are to be inserted to fill the detected gap length and then inserting the calculated number of audio frames between the initial audio segment and the subsequent audio segment. In some examples, the first metadata is accessed from header information in the audio frames of the initial audio segment. The inserted audio frames are inserted into the detected gap until subsequent header information from audio frames in the subsequent audio segment is accessed to determine the audio characteristics of the subsequent audio segment.

In addition, a corresponding system for smoothing audio gaps using adaptive metadata includes at least one physical processor and physical memory comprising computer-executable instructions that, when executed by the physical processor, cause the physical processor to identify, within a media item that includes multiple audio segments, an initial audio segment and a subsequent audio segment that follows the initial audio segment. The processor next accesses a first set of metadata that corresponds to a last audio frame of the initial audio segment. The first set of metadata includes information indicating audio characteristics of the last audio frame of the initial audio segment. The processor further accesses a second set of metadata that corresponds to the first audio frame of the subsequent audio segment. The second set of metadata includes information indicating audio characteristics of the first audio frame of the subsequent audio segment. The processor also generates, based on the first and second sets of metadata, a new set of metadata that is based on both the audio characteristics of the last audio frame in the initial audio segment and the audio characteristics of the first audio frame in the subsequent audio segment. The processor then inserts at least one new audio frame between the last audio frame of the initial audio segment and the first audio frame of the subsequent audio segment, and applies the new set of metadata to the at least one new audio frame.

In some examples, the above-described method is encoded as computer-readable instructions on a computer-readable medium. In one example, a computer-readable medium includes one or more computer-executable instructions that, when executed by at least one processor of a computing device, cause the computing device to identify, within a media item that includes multiple audio segments, an initial audio segment and a subsequent audio segment that follows the initial audio segment. The processor also accesses a first set of metadata that corresponds to a last audio frame of the initial audio segment, where the first set of metadata includes information indicating one or more audio characteristics of the last audio frame of the initial audio segment. The processor further accesses a second set of metadata that corresponds to the first audio frame of the subsequent audio segment, where the second set of metadata includes information indicating one or more audio characteristics of the first audio frame of the subsequent audio segment. The processor also generates, based on the first and second sets of metadata, a new set of metadata that is based on both the audio characteristics of the last audio frame in the initial audio segment and the audio characteristics of the first audio frame in the subsequent audio segment, inserts at least one new audio frame between the last audio frame of the initial audio segment and the first audio frame of the subsequent audio segment, and applies the new set of metadata to the at least one new audio frame.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIGS. 6A and 6B illustrate graphs showing how audio sound levels spike upon insertion of a silent audio frame with no metadata smoothing.

Figure 1:
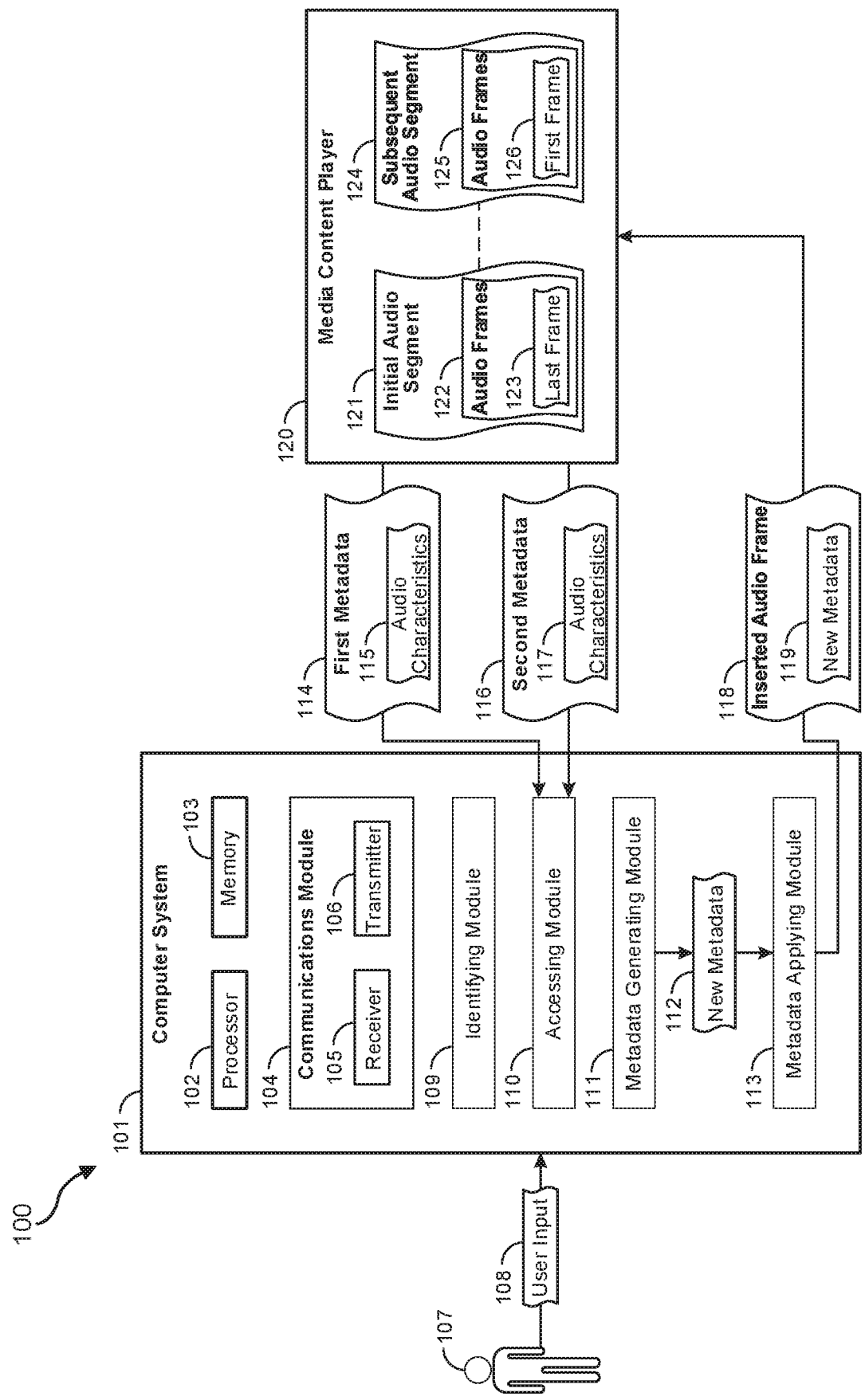
FIG. 1 illustrates a computing architecture in which various embodiments may be implemented, including a process for smoothing audio gaps using adaptive metadata.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to methods and systems for adaptively transitioning between audio segments using adaptive metadata. As noted above, content players will often reproduce a noticeable glitch during playback. This glitch may be audible and bothersome to a user. In the past, attempts have been made to remove these types of glitches by inserting silent frames between the audio segments. For example, if a user was viewing interactive content and switched from one part of the movie to a different part of the movie by making a certain selection, the content player would insert a silent audio frame between the last audio frame of the segment the user was currently listening to and the first audio frame of the next audio segment the user will listen to.

The insertion of this silent frame, however, does not account for differences in sound levels or other audio characteristics of the audio segments. For example, a user may be watching an interactive movie and the movie may currently be depicting a relatively slow portion where little action is happening. The movie may provide the user with one or more choices and the user may select a choice that takes the content player to a new position in the movie. The newly selected section of video, on the other hand, may be an action scene that has different audio characteristics (e.g., a relatively high sound level or a different dialog level). Simply inserting a silent audio frame between the last audio frame of the previous section and the first audio frame of the new section, in this case, will result in a large and immediate change in volume or change in dialogue level. This may be disruptive or distracting to the user. Still further, in the systems herein, other characteristics of the audio are also taken into consideration such as surround sound encoding, current bit rate, level of amplification, dynamic range control, downmixing and position, types of filters, or other audio characteristics. Simply inserting a silent frame between audio segments will not compensate for such changes in audio characteristics.

Accordingly, even in cases where video scenes are stitched seamlessly together in an interactive video, audio segments may have gaps between them that cannot simply be filled with a silent frame. In the embodiments described herein, audio gaps (such as those created when transitioning between audio segments) are smoothed using adaptive metadata. As the term is used herein, "adaptive metadata" refers to metadata that has been changed in some manner to conform to audio characteristics in the various audio segments. For instance, each audio frame in an audio segment (or at least some of the frames) may have metadata associated with it. The metadata specifies one or more characteristics of the audio for that audio frame including the type of encoding, bit rate, sound level, amplification level, dynamic range control, dialogue level, filters in use, or other audio characteristics. By accessing the metadata of the last audio frame to be played on the content player before transitioning to a new audio segment, and by accessing the metadata of the first audio frame in the new audio segment and then determining the various audio characteristics in that segment, the systems herein can calculate adaptive metadata that takes the audio characteristics of the previous segment and the characteristics of the next segment and merge them into new metadata that includes portions of each side's audio characteristics. This new metadata is then applied to audio frames that are inserted between audio segments. As such, the inserted frame(s) include audio characteristics of both the previous audio frame and the subsequent audio frame. These concepts will be described in greater detail below with regard to FIG. 1 and with further regard to method 200 of FIG. 2. When discussing the method 200 of FIG. 2, reference will be made to the embodiments illustrated in FIGS. 3-13.

FIG. 1 illustrates a computing environment 100 that includes a computer system 101. The computer system 101 includes software modules, embedded hardware components such as processors, or includes a combination of hardware and software. The computer system 101 includes substantially any type of computing system including a local computing system or a distributed (e.g., cloud) computing system. In some cases, the computer system 101 includes at least one processor 102 and at least some system memory 103. The computer system 101 includes program modules for performing a variety of different functions. The program modules are hardware-based, software-based, or include a combination of hardware and software. Each program module uses computing hardware and/or software to perform specified functions, including those described herein below.

The computer system 101 includes a communications module 104 that is configured to communicate with other computer systems. The communications module 104 includes any wired or wireless communication means that can receive and/or transmit data to or from other computer systems. These communication means include hardware interfaces including Ethernet adapters, WIFI adapters, hardware radios including, for example, a hardware-based receiver 105, a hardware-based transmitter 106, or a combined hardware-based transceiver capable of both receiving and transmitting data. The radios are cellular radios, Bluetooth radios, global positioning system (GPS) radios, or other types of radios. The communications module 104 is configured to interact with databases, mobile computing devices (such as mobile phones or tablets), embedded or other types of computing systems.

The computer system 101 also includes an identifying module 109. The identifying module 109 is configured to identify an initial audio segment 121 and a subsequent audio segment 124. In some cases, the initial audio segment 121 and the subsequent audio segment 124 are part of the same audio or audio/video file and, in other cases, are part of different audio files. Each audio segment 122/124 has one or more audio frames that include audio data that represents the underlying audio signal. Each frame has a specified amount of data depending on the encoding format used to create the audio file. The audio segments also include metadata that is accessed by the accessing module 110.

For example, in some embodiments, the accessing module 110 accesses first metadata 114 that includes audio characteristics 115 for the last audio frame 123 in a series of audio frames 122 in the initial audio segment 121. The accessing module 110 also accesses second metadata 116 that includes audio characteristics 117 for the first audio frame 126 in a series of audio frames 125 in the subsequent audio segment 124. The initial and subsequent audio segments 121/124 may appear substantially anywhere within the audio file and, in cases where the initial audio segment and subsequent audio segments are part of different audio files, each may appear substantially anywhere within those respective audio files. For the purposes of this paper, the terms "initial" and "subsequent" refer to the order in which the audio segments are spliced together, regardless of where the audio segments actually lie in the underlying audio file(s).

After the accessing module 110 accesses the first and second metadata 114/116, the metadata generating module 111 generates new metadata 112. This new metadata is adaptive metadata that forms a smooth transition between the audio characteristics of the last audio frame 123 of the initial audio segment 121 and the first audio frame 126 of the subsequent audio segment 124. As noted above, the metadata 114/116 specifies many different types of audio characteristics, and all or some of these may be different in the last and first audio frames (123/126, respectively). The metadata generating module 111 generates the new metadata 112 to smooth the transition between the last and first audio frames by taking some of the settings or current values or levels of those settings in the last frame 123 and shifting those settings or setting values to those identified in the metadata of the first frame 126. The shifting occurs gradually over many inserted frames, or occurs within a single inserted frame 118. The metadata applying module 113 applies the new metadata 112 to the inserted frame(s) 118. The inserted frames then include this metadata transition or metadata smoothing that gradually changes the settings or setting levels of the audio characteristics from the initial audio segment to the audio characteristics of the subsequent audio segment. This leads to a smooth transition that is substantially devoid of audible glitches, thus providing a more pleasant end-user experience when listening to the audio content.

Figure 2:
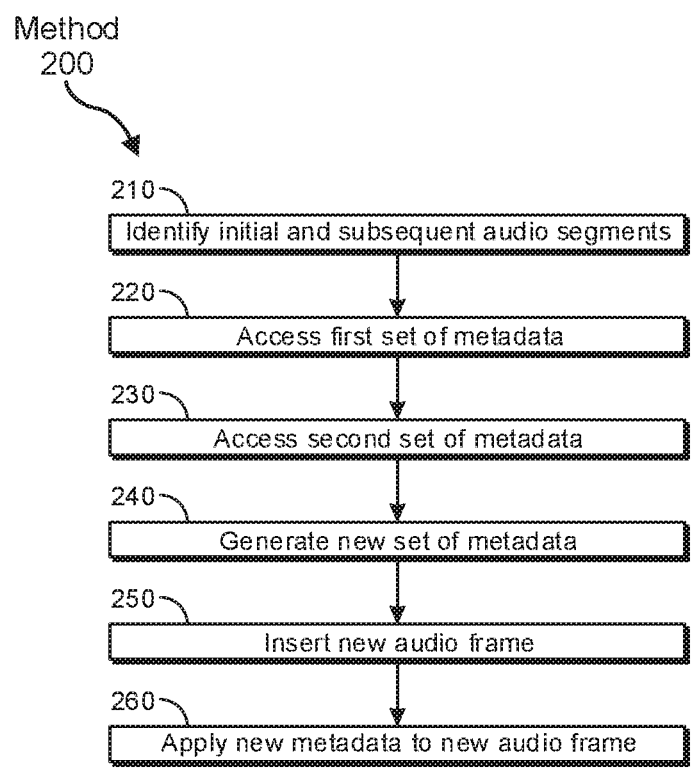
FIG. 2 is a flow diagram of an exemplary method for smoothing audio gaps using adaptive metadata.

FIG. 2 is a flow diagram of an exemplary computer-implemented method 200 for adaptively transitioning between audio segments using smoothed metadata. The steps shown in FIG. 2 are performable by any suitable computer-executable code and/or computing system, including the computer system 101 illustrated in FIG. 1. In one example, each of the steps shown in FIG. 2 represents an algorithm whose structure includes and/or is represented by multiple sub-steps, examples of which will be provided in greater detail below.

As illustrated in FIG. 2, at step 210, one or more of the systems described herein smooths audio gaps between audio segments by identifying, within at least one media item that includes a plurality of audio segments, an initial audio segment and a subsequent audio segment that follows the initial audio segment. In one case, for example, identifying module 109 of FIG. 1 identifies initial audio segment 121 and subsequent audio segment 124. Each audio segment includes one or more audio frames (122 and 125, respectively). The initial and subsequent audio segments are part of the same media item (e.g., a movie, a video clip, an audio clip, etc.), or are part of different media items. The media content player 120 of FIG. 1 is configured to play back media content including the initial audio segment 121 and the subsequent audio segment 124.

Some or all of the audio frames in the audio segments also include metadata. In some embodiments, the accessing module 110 of computer system 101 accesses a first set of metadata 114 that corresponds to a last audio frame 123 of the initial audio segment 121 (at step 220 of FIG. 2), and further includes accessing a second set of metadata 116 that corresponds to the first audio frame 26 of the subsequent audio segment 124 (at step 230 of FIG. 2). The first set of metadata 114 includes information indicating audio characteristics 115 of the last frame 123 of the initial audio segment 121, and the second set of metadata 116 includes information indicating audio characteristics 117 of the first frame 126 of the subsequent audio segment 124. The audio characteristics 115/117, as noted above, indicate different properties of the audio frames 122/125 and/or the media item(s) that include the initial and subsequent audio segments. The audio characteristics may include volume level, amplification level, encoding type, surround sound type, spatial cues, filters, dialogue level (aka dialog normalization), dynamic range control, downmixing and position, content description, or other information about the audio segments or information that is usable in playback of the media item.

This metadata 114/116 is then used to generate metadata for the frame or frames that are to be inserted between the last frame 123 of the initial audio segment and the first frame 126 of the subsequent audio segment 124. Indeed, step 240 of Method 200 includes generating, based on the first and second sets of metadata 114/116, a new set of metadata 112 that is based on both the audio characteristics 115 of the last audio frame 123 in the initial audio segment 121 and the audio characteristics 117 of the first audio frame 126 in the subsequent audio segment 124. The method 200 then includes inserting, at step 250, at least one new audio frame 118 between the last audio frame 123 of the initial audio segment 121 and the first audio frame 126 of the subsequent audio segment 124, and applying, at step 260, the new set of metadata 112 to the at least one new audio frame 118.

In some cases, the newly generated metadata 112 includes some audio characteristics 115 of the last audio frame 123 and some audio characteristics 117 of the first audio frame 126. The accessing module 110 accesses metadata 114/116 from the last and first audio frames of the two audio segments that are to be joined and determines which audio characteristics are listed in the metadata or are being actively used, and what levels or settings they are currently set at. For instance, the audio characteristic "loudness" may be set to 15 in first metadata 114 for the last frame 123, and may be set to 19 in the second metadata 116 for the first frame 126. In such cases, the metadata generating module 111 determines that the audio characteristic "loudness" is to be transitioned from level 15 in the last frame 123 to level 19 in the first frame 126. If the transition between segments lasts a single frame, the inserted audio frame 118 would include a loudness level of 17, evenly transitioning from 15 to 19. If the transition between segments lasts multiple frames (e.g., three frames), the three inserted frames would include loudness levels of 16, 17, and 18, respectively. In this manner, the audio characteristic "loudness" would transition from the initial value in the last frame 123 to the subsequent value in the first frame 126. It will be understood here that loudness is only one example of an audio characteristic and that the numerical values were arbitrarily chosen. In practice, the audio characteristic is substantially any type of audio setting or parameter, and is transitioned using increments that are appropriate for that type of audio characteristic.

Figure 3A:
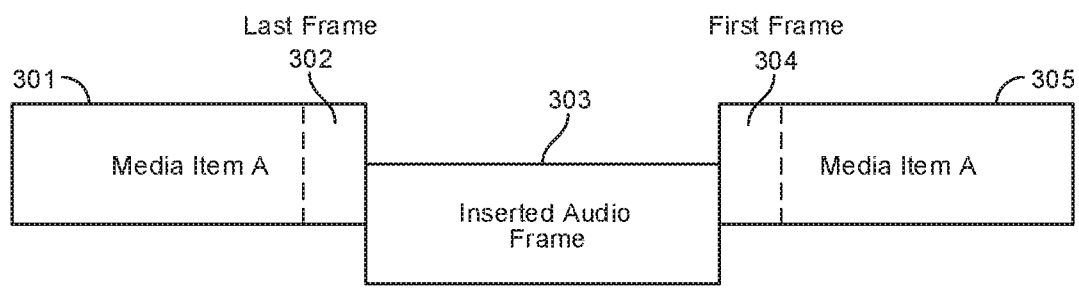
FIGS. 3A and 3B illustrate embodiments in which an audio frame is inserted into a media item.
Figure 3B:
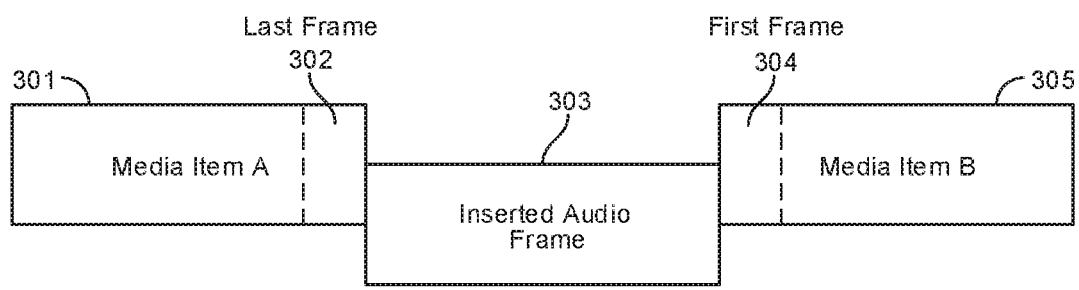

Turning now to FIG. 3A, an embodiment is illustrated in which the initial audio segment 301 and the subsequent audio segment 305 are part of the same media item (e.g., media item A). In this example, audio frame 303 is inserted between the last audio frame 302 of the initial audio segment 301 and the first audio frame 304 of the subsequent audio segment 305. In FIG. 3B, the initial audio segment 301 is part of one media item (e.g., media item A), and the subsequent audio segment 305 is part of another media item (e.g., media item B). The audio frame 303 in FIG. 3B is inserted between the last audio frame 302 of the initial audio segment 301 and the first audio frame 304 of the subsequent audio segment 305. In either embodiment as shown in FIG. 3A or 3B, the inserted audio frame 303 includes either multiple audio frames or just a single frame. In some cases, the initial and subsequent audio segments correspond to different media items (e.g., FIG. 3B) or, in other cases, are different parts of the same media item (e.g., FIG. 3A).

For example, in one case, media item A is an interactive media item that allows out-of-order playback of audio segments. Thus, for example, users make selections that cause the playback to skip from one position to another, potentially back in time relative to the underlying linearly encoded media item. In one case, for example, the subsequent audio segment 305 is an out-of-order audio segment within the same media item (e.g., media item A). Thus, even though the subsequent audio segment 305 represents an out-of-order segment in media item A, the metadata generating module 111 of FIG. 1 will still look at the last audio frame 302 of the initial audio segment 301 and the first audio frame 304 of the subsequent segment 305 to access current audio characteristics specified in the respective metadata. The metadata applying module 113 will then apply new metadata that transitions audio characteristics from the last audio frame 302 to the first audio frame 304 to the inserted audio frame 303. In this manner, regardless of whether the initial and subsequent audio segments are from the same media item or are from different media items that are being spliced together, or are from media segments of the same media item that are played out of order, the inserted audio frame 303 with the new metadata 112 will apply a smooth transition between those audio segments. And, in at least some cases, the transition will be undetectable or nearly undetectable by the user of the media item.

In some embodiments, the generated new portion of metadata (e.g., 112 of FIG. 1) is adaptive metadata configured to adapt to the audio characteristics of the last audio frame in the initial audio segment and to the audio characteristics of the first audio frame in the subsequent audio segment. In FIG. 3A, for example, adaptive metadata included in inserted audio frame 303 adapts the audio characteristics of the last audio frame 302 in the initial segment 301 to the audio characteristics of the first audio frame 304 in the subsequent audio segment 305.

Figure 4A:
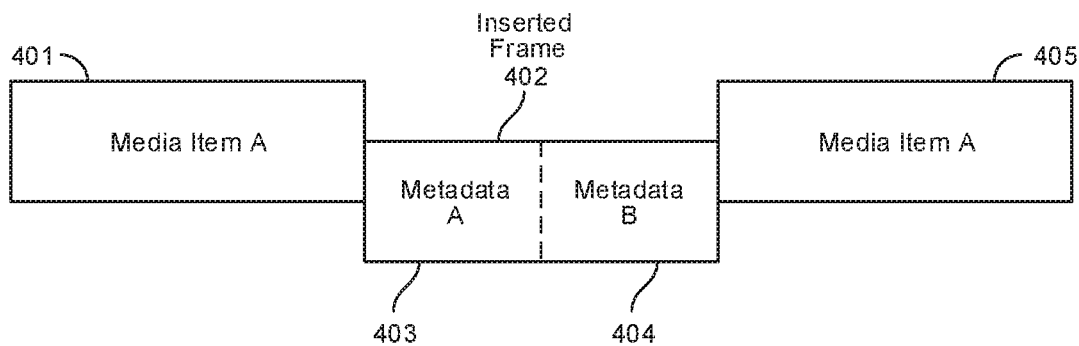
FIGS. 4A and 4B illustrate embodiments in which an audio frame is inserted in between two different media items.
Figure 4B:
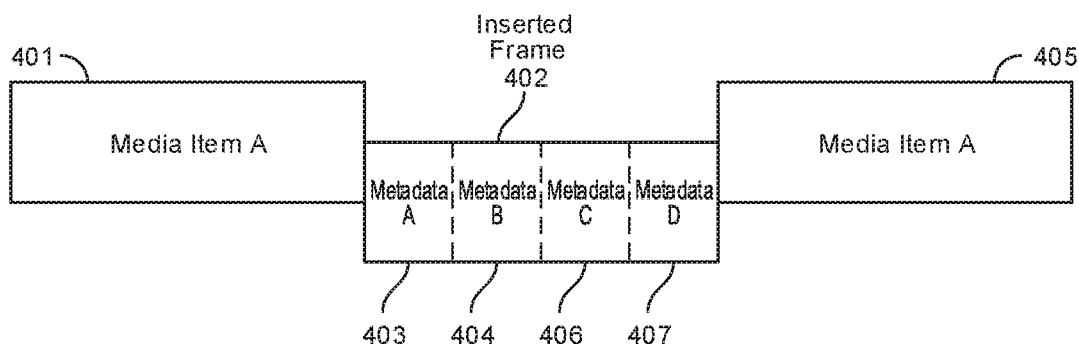

In FIG. 4A, the new, inserted audio frame 402 (a single frame) includes multiple sub-portions over which the audio characteristics of the last audio frame in the initial audio segment are transitioned to the audio characteristics of the first audio frame in the subsequent audio segment using the adaptive metadata. Thus, at least in some embodiments, a single inserted frame 402 includes two (or more) different parts, including metadata A (403) and metadata B (404). In such cases, the metadata A includes the audio characteristics and settings of the initial audio segment 401 and metadata B includes the audio characteristics and settings of the subsequent audio segment 405. As such, the initial and subsequent segments are stitched together using the inserted frame 402. In this manner, the transition between audio segments having disparate audio characteristics is smoothed, with each media segment contributing the audio characteristics (or, at least, the levels or settings associated with each audio characteristic) used in the inserted frame.

In some cases, the metadata for the inserted frame 402 is divided into three, four, or more different portions. In the embodiment shown in FIG. 4B, for example, the audio characteristics are divided into fourths, such that metadata A (403) includes 100% of the audio characteristics of initial audio segment 401 and 0% of the audio characteristics of subsequent audio segment 405, metadata B (404) includes 60% 40% metadata C (406) include 40% 60%, and metadata D (407) includes 0% 100%. In cases where one audio frame is 1024 bytes (e.g., at a bit rate of 256 kbps), for example, the computer system will divide the inserted frame 402 into four subframes of 256 bytes each and perform adaptive smoothing over all four subframes or over some sub-portion of the subframes including one, two, or three subframes. This provides for an even smoother transition, as each metadata portion progressively includes fewer audio characteristics of the initial audio segment 401 and more audio characteristics of the subsequent audio segment 405.

Figure 5:
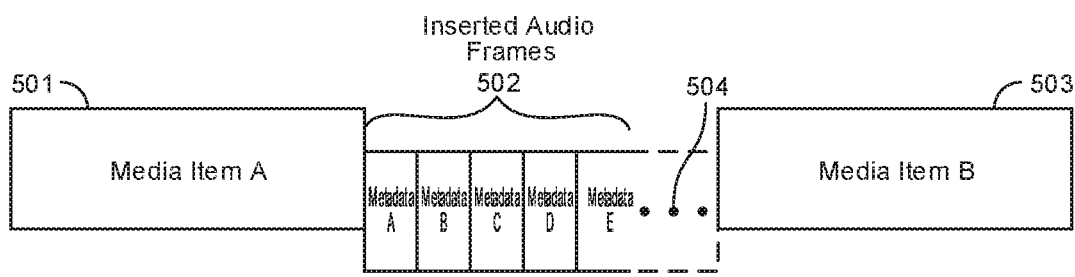
FIG. 5 illustrates an embodiment in which multiple audio frames are inserted in between media items.

In some cases, the initial and subsequent audio segments are separated by multiple audio frames (not just a single frame with multiple portions). As shown in FIG. 5, the new audio frames 502 are designed to transition the audio characteristics of the last audio frame in the initial audio segment 501 to the audio characteristics of the first audio frame in the subsequent audio segment 503 using adaptive metadata. The adaptive metadata is generated and inserted into each new audio frame 502. Thus, metadata A is inserted into the first inserted audio frame 502, metadata B is inserted into the second inserted audio frame, and so on (as indicated by ellipses 504). Each inserted audio frame includes metadata that transitions the audio characteristics of the initial segment 501 to the subsequent audio segment 503. The transition occurs more quickly if there are fewer inserted frames, or occurs more slowly and smoothly if there are more inserted frames. In some cases, each of the inserted frames includes multiple portions (as in FIG. 4A), and in other cases, each of the inserted audio frames includes only a single portion of adaptive metadata.

In the embodiment shown in FIG. 5, the computer system generating the inserted audio frames 502 and corresponding metadata may not know when the first audio frame of the subsequent audio segment will begin playback. As such, the computer system (e.g., 101 of FIG. 1) dynamically inserts each audio frame with its corresponding adaptive metadata into a string of inserted audio frames until the first audio frame of the subsequent audio segment 503 is reached. In some cases, the number of inserted audio frames having adaptive metadata depends on the length of time between playback of the last audio frame in the initial audio segment 501 and the first audio frame in the subsequent audio segment 503. Thus, if the duration between audio segments is short, fewer audio frames will be dynamically inserted and, if the duration is longer, more audio frames will be dynamically inserted. Because, in these cases, the metadata and audio characteristics of the subsequent audio segment is, at least in some cases, unknown, the dynamically inserted frames may transition the audio characteristic to preestablished default values or to user-specified transition values. In some cases, the adaptive metadata needs a specified minimum number of audio frames over which the transition is to be applied. In such cases, the computer system generates the specified minimum number of audio frames and applies the corresponding adaptive metadata to each frame as the frames are dynamically generated.

Figure 6A:
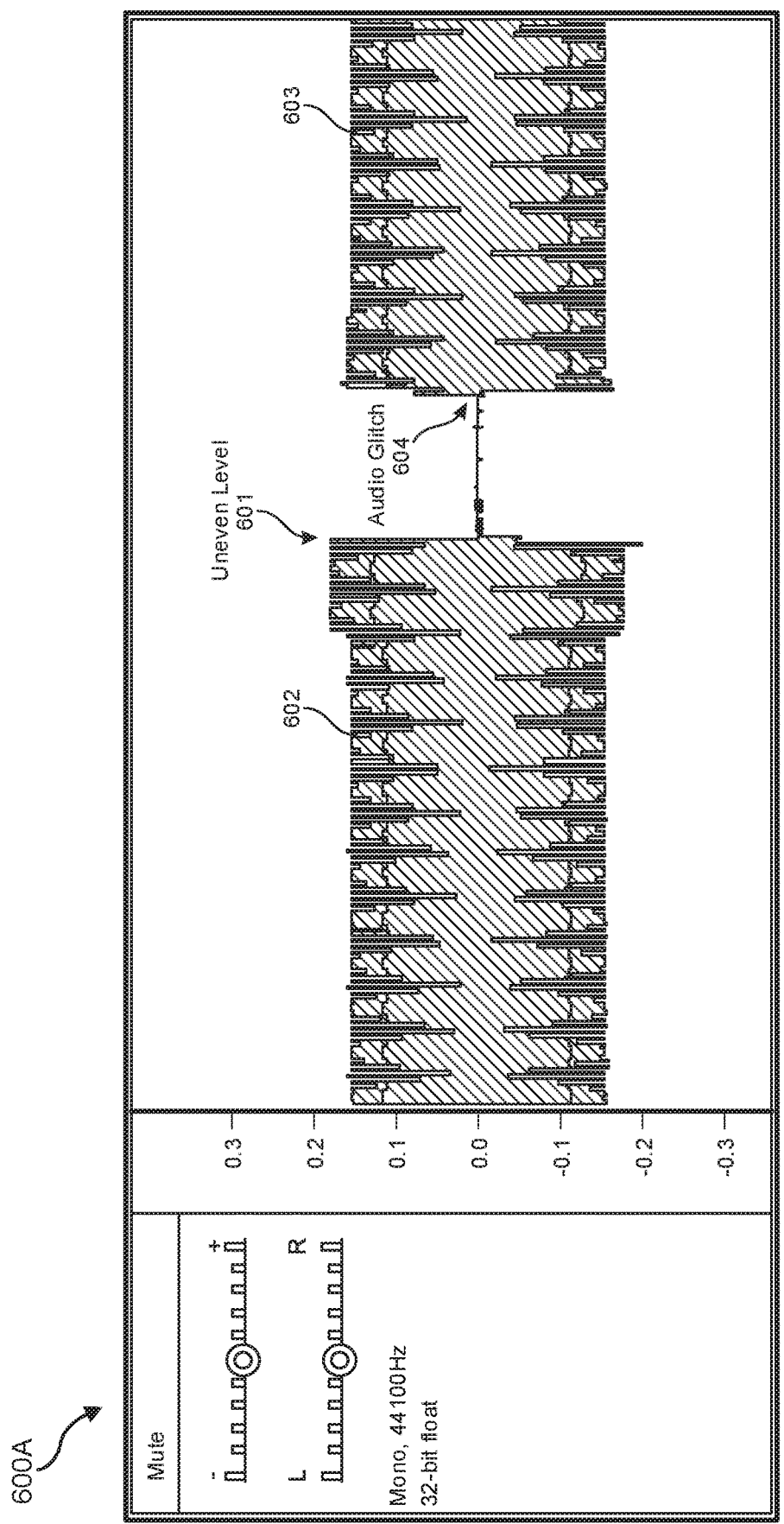
Figure 7A:
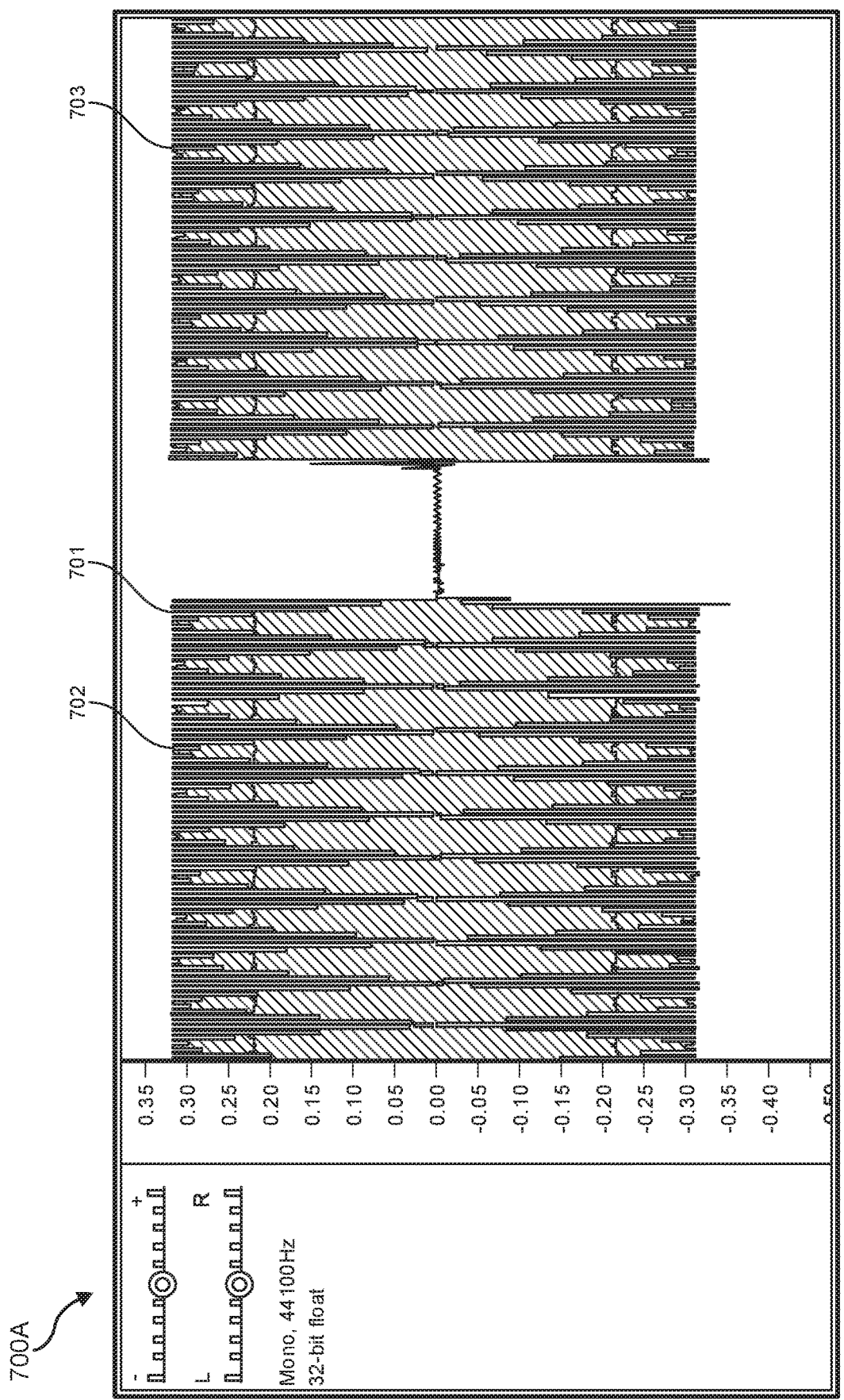
FIGS. 7A and 7B illustrate graphs showing how audio sound levels are smoothed upon inserting one or more silent audio frames with smoothed metadata.
Figure 7B:
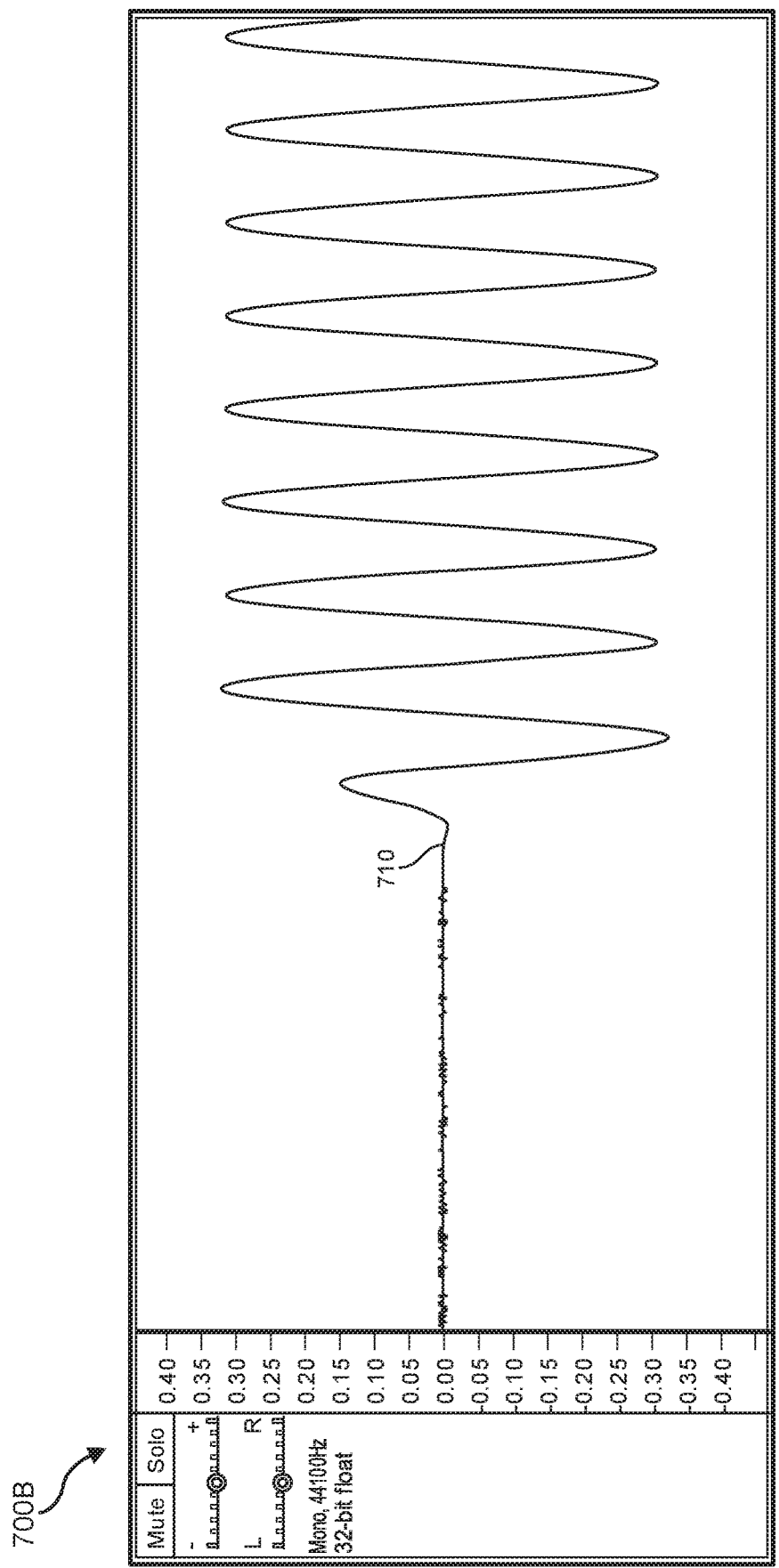

FIGS. 6A and 6B illustrate embodiments in which a gap or glitch is evident when combining two audio segments. Corresponding FIGS. 7A and 7B illustrate embodiments in which the gap or glitch is removed (or is at least substantially diminished) by applying adaptive metadata. In FIG. 6A, an initial audio segment 602 (which may be the same as or different than initial audio segment 121 of FIG. 1) is shown as an analog signal playing over time in chart 600A. In traditional systems, when the initial audio segment 602 is joined to the subsequent audio segment 603, at least a portion of the transition will be uneven, as evidenced by the uneven level 601. In FIG. 6A, the gap between the initial and subsequent audio segments is filled with a static silent frame that has non-adaptive metadata, two artifacts are depicted as uneven level 601 and audio glitch 604. FIG. 6B illustrates a zoomed-in version of the waveform, highlighting the uneven level 604 of FIG. 6A as a glitch 610 in chart 600B of FIG. 6B. Chart 700A of FIG. 7A, on the other hand, shows how, using adaptive metadata, the uneven level 701 and glitch 704 are removed and how the waveform is substantially the same as the initial audio segment 702 and the subsequent audio segment 703. Similarly, in chart 700B of FIG. 7B, the zoomed-in version of the waveform shows how the glitch 710 is substantially reduced in size (or is completely eliminated) using adaptive metadata smoothing.

In some cases, this adaptive metadata smoothing is carried out in a manner that optimizes computer resources. For instance, in order to provide the results shown in FIGS. 7A and 7B and still order to conserve processing resources, the adaptive metadata smoothing process stores the inserted audio frame (e.g., a silent frame) on the local electronic device (i.e., the playback device). In some cases, the size of the silent frame varies based on the bit rate of the source audio (e.g., a silent frame at a bit rate of 256 kbps is 1024 bytes, while a silent frame at 640 kbps is 2560 bytes). In other cases, the stored silent frame is stored at a single, fixed bit rate, instead of storing different-sized frames for each bit rate in a range of possible bit rates that may range from 128 kbps to 768 kbps or more. In some cases, the inserted audio frame includes different elements including audio stream coding information (ASCI), which includes data rate (and, thus, frame size), channel mapping, coding profiles, and/or global metadata, audio frame coding information (AFCI), which includes parameters and metadata that control the frame decoding and block construction, and audio block coding information (ABCI), which includes parameters and metadata that control the audio block decoding.

In one embodiment, an adaptive audio smoothing frame is efficiently generated by 1) processing ASCI from a known good ASCI into the stored (silent) audio frame, 2) passing AFCI metadata into the stored audio frame, 3) inserting the ABCI metadata into the stored audio frame, 4) repeating step 3 until all blocks are processed, 5) padding zero into audio frames to match the frame size determined by the audio stream bitrate, and 6) generating audio error detection or correction codes. Using this algorithm, the computer system (e.g., 101 of FIG. 1) or other playback device stores data for different coding types and channel mappings (e.g., data for the High-Efficiency Advanced Audio Coding (HE-AAC) encoding type or Dolby Digital (both of which have 2-channel mapping), or data for Dolby Atmos with a 5.1 or 5.1.2 channel mapping). By saving data only for different coding types and channel mappings, and by implementing the above algorithm to generate an adaptive audio smoothing frame, significantly less data is downloaded and subsequently stored on the playback device, thus using less bandwidth, less data storage, and less processor time processing incoming data.

As noted above, the embodiments and processes described herein may be applied to substantially any scenarios where multiple audio segments from multiple sources are stitched together. In at least some cases, the methods and systems described herein are designed to handle the stitching of the two audio segments while the corresponding data is still in the transmitted bitstream, as opposed to performing the stitching after pulse-code modulation (PCM) has been decoded. Because the two audio segments are merged prior to PCM decoding, the methods described herein may be implemented in cases where a pass-through only device is used.

Figure 8:
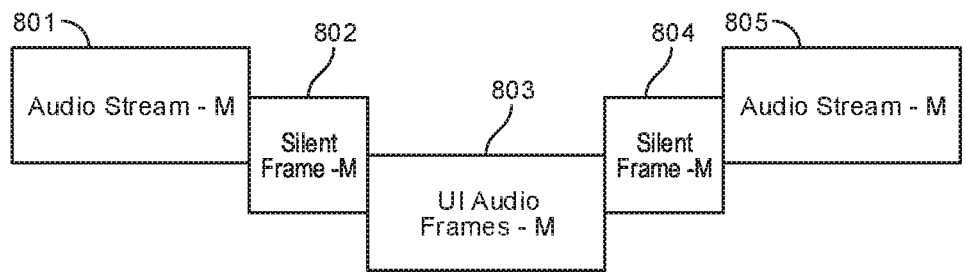
FIG. 8 illustrates an embodiment in which user interface audio frames are inserted into an audio stream.

In some embodiments, for example, as shown in FIG. 8, the initial audio segment 801 and the subsequent audio segment 805 are inserted into a pass-through device. This insertion into a pass-through device includes the following: 1) copying the first metadata from the initial audio frame 801 into a silent audio frame 802, 2) inserting the silent audio frame 802 after the last audio frame of the initial audio segment 801, 3) copying the first metadata into a pre-encoded user interface audio segment having one or more audio frames 803, 4) inserting the pre-encoded user interface audio segment, 5) inserting the silent audio frame 804 after the inserted pre-encoded user interface audio segment, and 6) removing a specified number of audio frames from the subsequent audio segment 805 to maintain audio/video synchronization. In some cases, prior to initiating the adaptive smoothing method, the user interface audio is pre-encoded with the same bit rate and channel mapping, and is downloaded with other UI information.

Figure 9A:
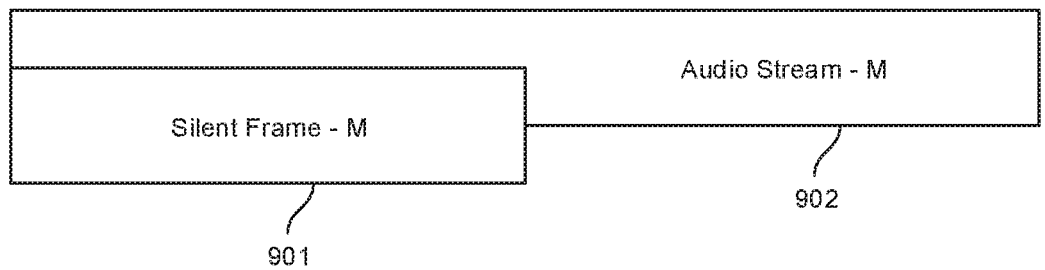
FIGS. 9A and 9B illustrate example embodiments in which audio is eased when starting or stopping audio playback.
Figure 9B:
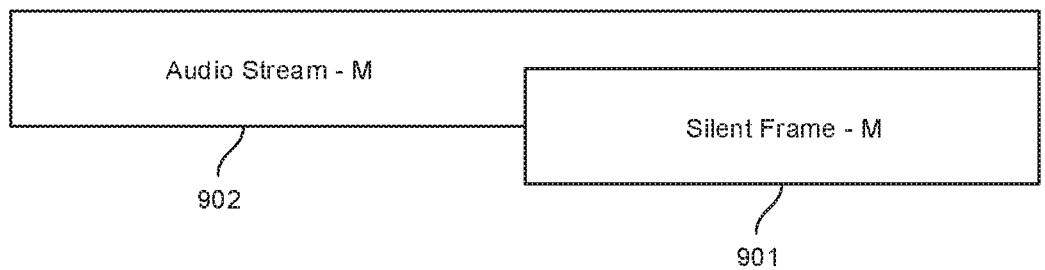

In another example, as shown in FIGS. 9A and 9B, adaptive metadata is implemented to smooth transitions when audio segments are initially started and when the audio segments are subsequently stopped (e.g., when a user initially hits "play" or subsequently hits "stop" on a media item). In such cases, a silent frame 901 having adaptive metadata is inserted prior to starting the audio stream (M) 902, as in FIG. 9A, and the same or a different silent frame 901 having adaptive metadata is inserted after stopping the audio stream 902. One method for implementing adaptive metadata to smooth these audio start transitions includes 1) detecting that playback of the initial audio segment or the subsequent audio segment (both referred to as audio stream (M) 902) has been directed to start, 2) initiating playback of the initial audio segment or the subsequent audio segment at a specified position, the initial audio segment or the subsequent audio segment having a current sound pressure level, and then 3) inserting one or more silent frames 901 at the specified position before the initial audio segment or the subsequent audio segment are played back. The appended audio frames include adaptive metadata that gradually increases the current sound pressure level to a specified sound pressure level. Thus, when initially starting playback of a media item, one or more inserted silent frames with adaptive metadata will transition from an initial sound pressure level of zero (or near zero) to the current playback sound pressure level.

One method for implementing adaptive metadata to smooth an audio stop transition includes 1) detecting that playback of the initial audio segment or the subsequent audio segment (collectively referred to as 902) has been directed to stop, 2) halting playback of the initial audio segment or the subsequent audio segment at a specified position, the initial audio segment or the subsequent audio segment having a current sound pressure level, and 3) appending one or more audio frames to the initial audio segment or the subsequent audio segment after the specified position. The appended audio frames include adaptive metadata that gradually reduces the current sound pressure level to a specified sound pressure level. Thus, when a user starts a media segment that includes audio, the transition to playing the audio will be smoothed using adaptive metadata that transitions from no sound level (or other audio characteristics) to the sound level or other audio characteristics of the audio segment. Similarly, when a user stops a media segment that includes audio, the transition to fully stopping playback of the audio will be smoothed using adaptive metadata that transitions from the current sound level (and other associated audio characteristics) to a sound level of zero (or near zero).

Figure 10A:
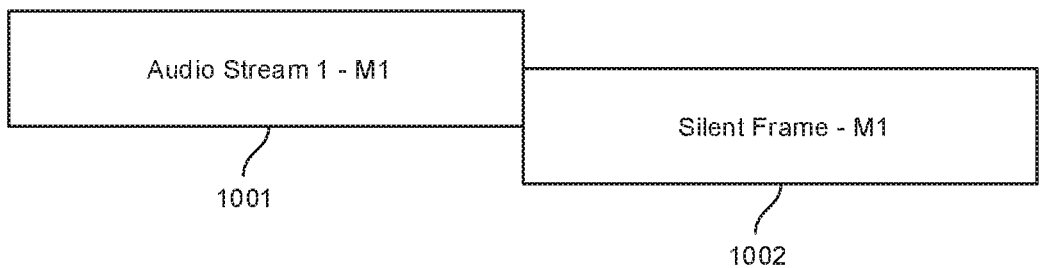
FIGS. 10A-10C illustrate example embodiments in which audio gaps are smoothed using adaptive metadata.
Figure 10B:
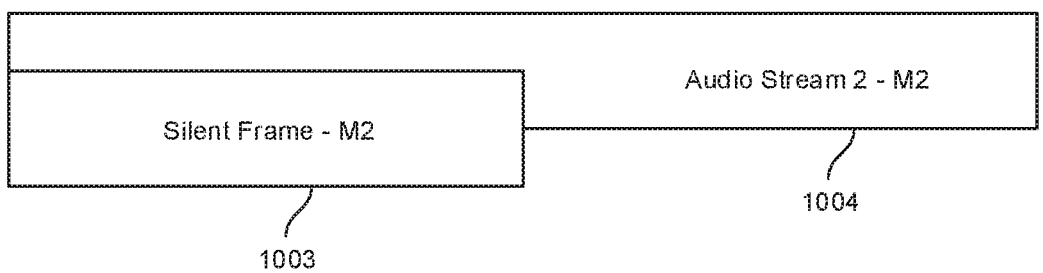
Figure 10C:
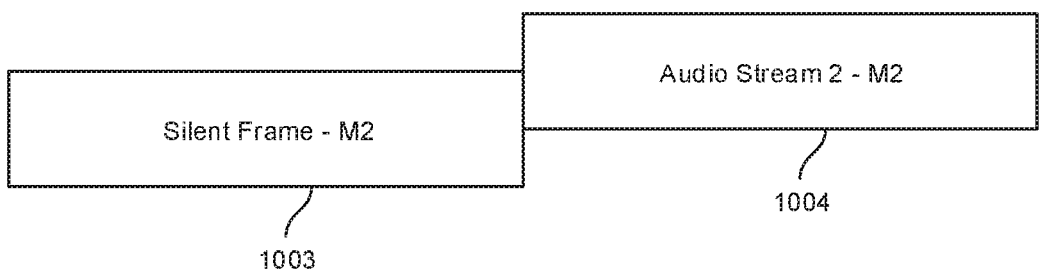

FIGS. 10A-10C illustrate embodiments in which various lengths in gaps between audio segments are identified and appropriately handled. In some embodiments, the HE-AAC encoding type is implemented to encode the audio stream 1001. Metadata in such streams includes some encoding parameters that, at least in some embodiments, are skipped during streaming in order to save bandwidth. For example, in order to conserve bandwidth, spectral band replication (SBR) headers are often only attached every 0.5 seconds (as opposed to being attached to every audio frame) in an HE-AAC stream. These parameters are used to restore correct audio samples when two audio streams are stitched together. Since there is no guarantee that HE-AAC header will be available right after the audio gap between audio segments, older traditional solutions will insert an ERROR frame. However, there is a risk that not all HE-AAC decoders will handle the error in the same way. As such, simply inserting an ERROR frame will lead to unpredictable results among the many different types of playback devices currently available (e.g., smartphones, televisions, streaming devices, etc.). In order to fill the HE-AAC audio gap properly (or to fill audio gaps in other encodings), adaptive metadata (which includes the SBR header) is implemented to perform the audio transition without glitches.

In one embodiment, as shown in FIG. 10A, the audio gap is handled by performing the following method steps: 1) capturing the metadata (M1) of the audio stream 1001, 2) creating a silent frame 1002 with the same bit rate as stream 1001, 3) copying the metadata M1 into the silent frame 1002, and re-calculate the cyclic redundancy check (CRC) if needed, 4) inserting the silent frame 1002 having metadata M1 into the gap, and 5) ending insertion of the first silent frame. Then, before audio stream 1004, performing the following method steps: 1) capturing the metadata (M2) from the first audio frame in audio stream 1004, 2) if metadata M2 is the same as metadata M1, skipping to step 7), or if M2 is not available, skipping to step 7), 3) creating a silent frame 1003 with the same bit rate as audio stream 1004, 4) copying the metadata M2 into the silent frame 1003, and re-calculating the CRC if needed, 5) if the gap is just one frame (as shown in FIG. 10B), replacing the 1st frame of audio stream 1004 with the silent frame 1003 having metadata M2 and skipping to step 7), 6) if the gap is wider than one frame (as shown in FIG. 10C), inserting the silent frame 1003 having metadata M2 before the audio stream 1004, and 7) ending inserting the silent frame and ending filling the audio gap.

Using this method, the playback device (or the audio provisioning system) thus detects a gap length in time between playback of the initial audio segment and playback of the subsequent audio segment, which can be anywhere from a single frame (as shown in FIG. 10B) to multiple frames (as shown in FIG. 10C). The playback device (or the audio provisioning system) then calculates the number of audio frames that are to be inserted to fill the detected gap length and inserts the calculated number of audio frames between the initial audio segment and the subsequent audio segment. In some cases, metadata is accessed from header information in the audio frames of the initial audio segment, and the inserted audio frames (e.g., 1003) are continuously inserted into the detected gap until subsequent header information from audio frames in the subsequent audio segment is accessed to determine the audio characteristics of the subsequent audio segment. Such embodiments can thus fill gaps of indeterminate length with adaptive metadata designed to smooth the transition between the audio segments being stitched together.

In addition to the methods described above, a corresponding system for smoothing audio gaps using adaptive metadata is also provided. The system includes at least one physical processor and physical memory comprising computer-executable instructions that, when executed by the physical processor, cause the physical processor to identify, within at least one media item that includes a plurality of audio segments, an initial audio segment and a subsequent audio segment that follows the initial audio segment. The processor next accesses a first set of metadata that corresponds to a last audio frame of the initial audio segment. The first set of metadata includes information indicating audio characteristics of the last audio frame of the initial audio segment. The processor further accesses a second set of metadata that corresponds to the first audio frame of the subsequent audio segment. The second set of metadata includes information indicating audio characteristics of the first audio frame of the subsequent audio segment. The processor also generates, based on the first and second sets of metadata, a new set of metadata that is based on both the audio characteristics of the last audio frame in the initial audio segment and the audio characteristics of the first audio frame in the subsequent audio segment. The processor then inserts at least one new audio frame between the last audio frame of the initial audio segment and the first audio frame of the subsequent audio segment, and applies the new set of metadata to the at least one new audio frame.

In addition to this system, the above-described method is encoded as computer-readable instructions on a computer-readable medium. For example, a computer-readable medium includes one or more computer-executable instructions that, when executed by at least one processor of a computing device, cause the computing device to identify, within at least one media item that includes a plurality of audio segments, an initial audio segment and a subsequent audio segment that follows the initial audio segment. The processor also accesses a first set of metadata that corresponds to a last audio frame of the initial audio segment, where the first set of metadata includes information indicating one or more audio characteristics of the last audio frame of the initial audio segment. The processor further accesses a second set of metadata that corresponds to the first audio frame of the subsequent audio segment, where the second set of metadata includes information indicating one or more audio characteristics of the first audio frame of the subsequent audio segment. The processor also generates, based on the first and second sets of metadata, a new set of metadata that is based on both the audio characteristics of the last audio frame in the initial audio segment and the audio characteristics of the first audio frame in the subsequent audio segment, inserts at least one new audio frame between the last audio frame of the initial audio segment and the first audio frame of the subsequent audio segment, and applies the new set of metadata to the at least one new audio frame.

Accordingly, in this manner, adaptive metadata is dynamically calculated and implemented within inserted audio frames to smooth the transition between audio segments. This adaptive metadata is used to smooth transitions at startup, when stopping playback, or when transitioning between audio clips that are part of a movie or are stand-alone audio segments. The adaptive metadata may be applied in substantially any scenario where audio segments are being transitioned from one state to another. By taking into account the audio characteristics of the various audio segments, the adaptive metadata smooths transitions in such a manner that changes between audio segments are substantially free of glitches or other audibly perceptible issues that could be distracting to a user.

Figure 11:
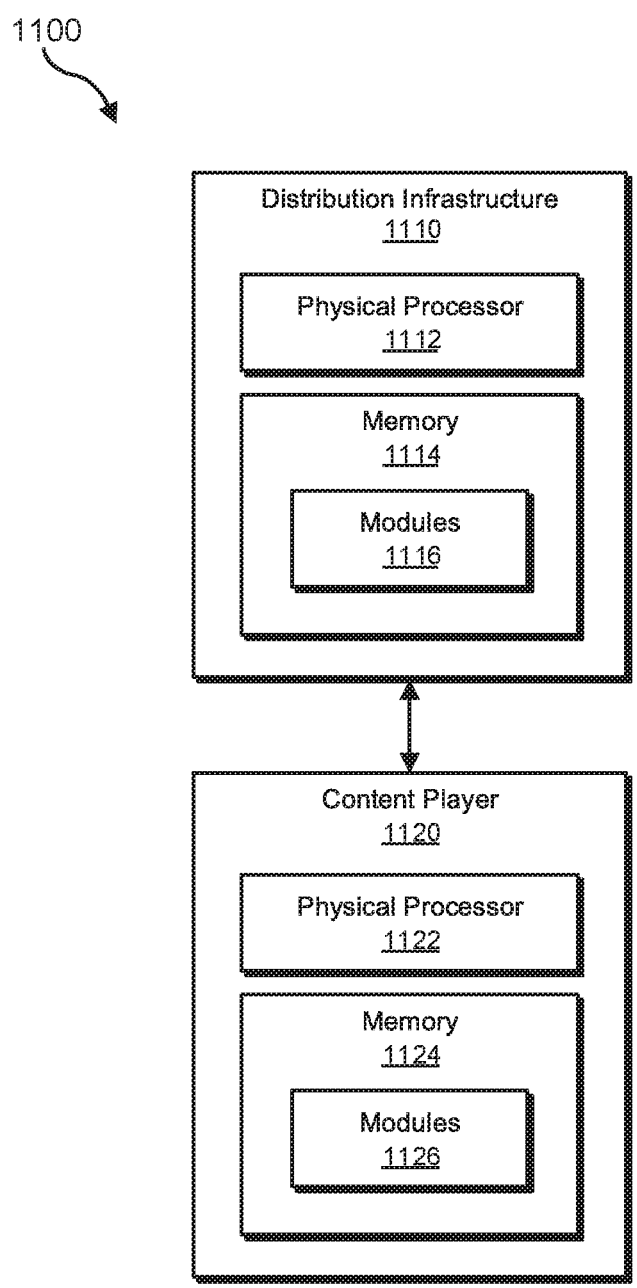
FIG. 11 is a block diagram of an exemplary content distribution ecosystem.
Figure 12:
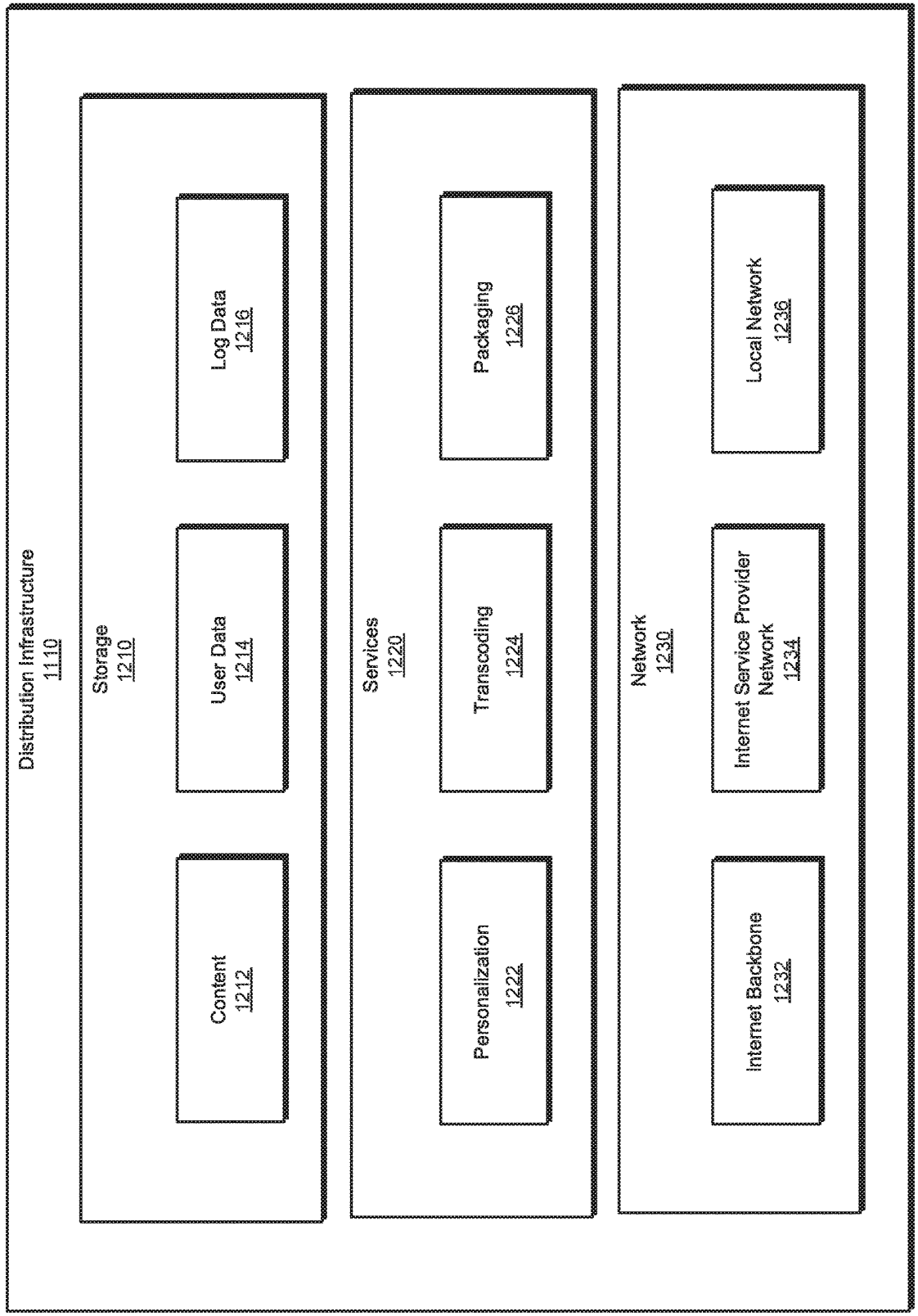
FIG. 12 is a block diagram of an exemplary distribution infrastructure within the content distribution ecosystem shown in FIG. 11.
Figure 13:
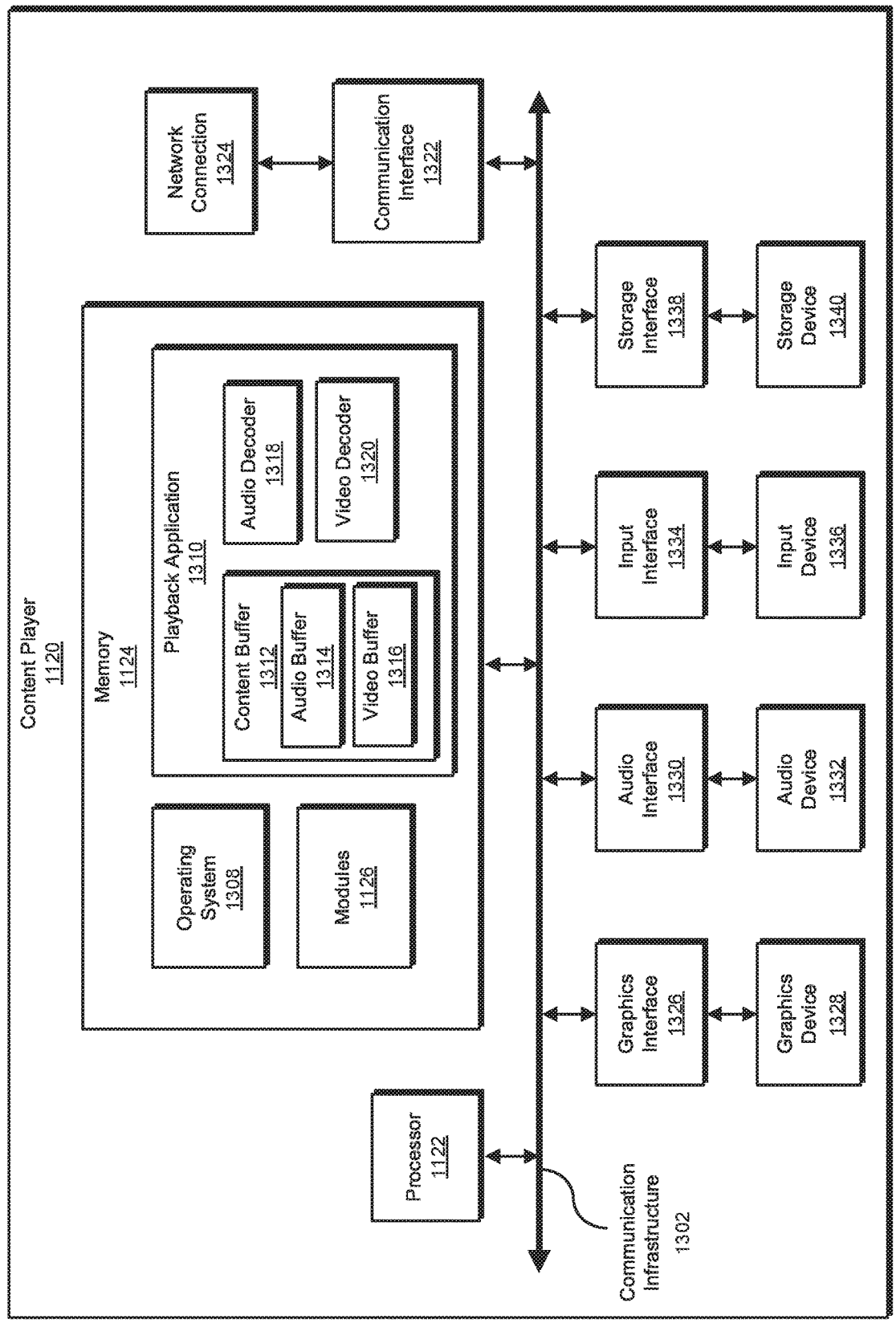
FIG. 13 is a block diagram of an exemplary content player within the content distribution ecosystem shown in FIG. 11.

The following will provide, with reference to FIG. 11, detailed descriptions of exemplary ecosystems in which content is provisioned to end nodes and in which requests for content are steered to specific end nodes. The discussion corresponding to FIGS. 12 and 13 presents an overview of an exemplary distribution infrastructure and an exemplary content player used during playback sessions, respectively.

FIG. 11 is a block diagram of a content distribution ecosystem 1100 that includes a distribution infrastructure 1100 in communication with a content player 1120. In some embodiments, distribution infrastructure 1100 is configured to encode data at a specific data rate and to transfer the encoded data to content player 1120. Content player 1120 is configured to receive the encoded data via distribution infrastructure 1100 and to decode the data for playback to a user. The data provided by distribution infrastructure 1100 includes, for example, audio, video, text, images, animations, interactive content, haptic data, virtual or augmented reality data, location data, gaming data, or any other type of data that is provided via streaming.

Distribution infrastructure 1100 generally represents any services, hardware, software, or other infrastructure components configured to deliver content to end users. For example, distribution infrastructure 1100 includes content aggregation systems, media transcoding and packaging services, network components, and/or a variety of other types of hardware and software. In some cases, distribution infrastructure 1100 is implemented as a highly complex distribution system, a single media server or device, or anything in between. In some examples, regardless of size or complexity, distribution infrastructure 1100 includes at least one physical processor 1112 and at least one memory device 1114. One or more modules 1116 are stored or loaded into memory 1114 to enable adaptive streaming, as discussed herein.

Content player 1120 generally represents any type or form of device or system capable of playing audio and/or video content that has been provided over distribution infrastructure 1100. Examples of content player 1120 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 1100, content player 1120 includes a physical processor 1122, memory 1124, and one or more modules 1126. Some or all of the adaptive streaming processes described herein is performed or enabled by modules 1126, and in some examples, modules 1116 of distribution infrastructure 1100 coordinate with modules 1126 of content player 1120 to provide adaptive streaming of multimedia content.

In certain embodiments, one or more of modules 1116 and/or 1126 in FIG. 11 represent one or more software applications or programs that, when executed by a computing device, cause the computing device to perform one or more tasks. For example, and as will be described in greater detail below, one or more of modules 1116 and 1126 represent modules stored and configured to run on one or more general-purpose computing devices. One or more of modules 1116 and 1126 in FIG. 11 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 1112 and 1122 generally represent any type or form of hardware-implemented processing unit capable of interpreting and/or executing computer-readable instructions. In one example, physical processors 1112 and 1122 access and/or modify one or more of modules 1116 and 1126, respectively. Additionally or alternatively, physical processors 1112 and 1122 execute one or more of modules 1116 and 1126 to facilitate adaptive streaming of multimedia content. Examples of physical processors 1112 and 1122 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 1114 and 1124 generally represent any type or form of volatile or non-volatile storage device or medium capable of storing data and/or computer-readable instructions. In one example, memory 1114 and/or 1124 stores, loads, and/or maintains one or more of modules 1116 and 1126. Examples of memory 1114 and/or 1124 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 12 is a block diagram of exemplary components of content distribution infrastructure 1100 according to certain embodiments. Distribution infrastructure 1100 includes storage 1210, services 1220, and a network 1230. Storage 1210 generally represents any device, set of devices, and/or systems capable of storing content for delivery to end users. Storage 1210 includes a central repository with devices capable of storing terabytes or petabytes of data and/or includes distributed storage systems (e.g., appliances that mirror or cache content at Internet interconnect locations to provide faster access to the mirrored content within certain regions). Storage 1210 is also configured in any other suitable manner.

As shown, storage 1210 may store a variety of different items including content 1212, user data 1214, and/or log data 1216. Content 1212 includes television shows, movies, video games, user-generated content, and/or any other suitable type or form of content. User data 1214 includes personally identifiable information (PII), payment information, preference settings, language and accessibility settings, and/or any other information associated with a particular user or content player. Log data 1216 includes viewing history information, network throughput information, and/or any other metrics associated with a user's connection to or interactions with distribution infrastructure 1100.

Services 1220 includes personalization services 1222, transcoding services 1224, and/or packaging services 1226. Personalization services 1222 personalize recommendations, content streams, and/or other aspects of a user's experience with distribution infrastructure 1100. Encoding services 1224 compress media at different bitrates which, as described in greater detail below, enable real-time switching between different encodings. Packaging services 1226 package encoded video before deploying it to a delivery network, such as network 1230, for streaming.

Network 1230 generally represents any medium or architecture capable of facilitating communication or data transfer. Network 1230 facilitates communication or data transfer using wireless and/or wired connections. Examples of network 1230 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 12, network 1230 includes an Internet backbone 1232, an internet service provider 1234, and/or a local network 1236. As discussed in greater detail below, bandwidth limitations and bottlenecks within one or more of these network segments triggers video and/or audio bit rate adjustments.

FIG. 13 is a block diagram of an exemplary implementation of content player 1120 of FIG. 11. Content player 1120 generally represents any type or form of computing device capable of reading computer-executable instructions. Content player 1120 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 13, in addition to processor 1122 and memory 1124, content player 1120 includes a communication infrastructure 1302 and a communication interface 1322 coupled to a network connection 1324. Content player 1120 also includes a graphics interface 1326 coupled to a graphics device 1328, an input interface 1334 coupled to an input device 1336, and a storage interface 1338 coupled to a storage device 1340.

Communication infrastructure 1302 generally represents any type or form of infrastructure capable of facilitating communication between one or more components of a computing device. Examples of communication infrastructure 1302 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 1124 generally represents any type or form of volatile or non-volatile storage device or medium capable of storing data and/or other computer-readable instructions. In some examples, memory 1124 stores and/or loads an operating system 1308 for execution by processor 1122. In one example, operating system 1308 includes and/or represents software that manages computer hardware and software resources and/or provides common services to computer programs and/or applications on content player 1120.

Operating system 1308 performs various system management functions, such as managing hardware components (e.g., graphics interface 1326, audio interface 1330, input interface 1334, and/or storage interface 1338). Operating system 1308 also provides process and memory management models for playback application 310. The modules of playback application 1310 includes, for example, a content buffer 1312, an audio decoder 1318, and a video decoder 1310.

Playback application 1310 is configured to retrieve digital content via communication interface 1322 and to play the digital content through graphics interface 1326. Graphics interface 1326 is configured to transmit a rendered video signal to graphics device 1328. In normal operation, playback application 310 receives a request from a user to play a specific title or specific content. Playback application 310 then identifies one or more encoded video and audio streams associated with the requested title. After playback application 1310 has located the encoded streams associated with the requested title, playback application 1310 downloads sequence header indices associated with each encoded stream associated with the requested title from distribution infrastructure 1100. A sequence header index associated with encoded content includes information related to the encoded sequence of data included in the encoded content.

In one embodiment, playback application 1310 begins downloading the content associated with the requested title by downloading sequence data encoded to the lowest audio and/or video playback bit rates to minimize startup time for playback. The requested digital content file is then downloaded into content buffer 1312, which is configured to serve as a first-in, first-out queue. In one embodiment, each unit of downloaded data includes a unit of video data or a unit of audio data. As units of video data associated with the requested digital content file are downloaded to the content player 1120, the units of video data are pushed into the content buffer 1312. Similarly, as units of audio data associated with the requested digital content file are downloaded to the content player 1120, the units of audio data are pushed into the content buffer 1312. In one embodiment, the units of video data are stored in video buffer 1316 within content buffer 1312 and the units of audio data are stored in audio buffer 1314 of content buffer 1312.

A video decoder 1310 reads units of video data from video buffer 1316 and outputs the units of video data in a sequence of video frames corresponding in duration to the fixed span of playback time. Reading a unit of video data from video buffer 1316 effectively de-queues the unit of video data from video buffer 1316. The sequence of video frames is then rendered by graphics interface 1326 and transmitted to graphics device 1328 to be displayed to a user.

An audio decoder 1318 reads units of audio data from audio buffer 1314 and output the units of audio data as a sequence of audio samples, generally synchronized in time with a sequence of decoded video frames. In one embodiment, the sequence of audio samples are transmitted to audio interface 1330, which converts the sequence of audio samples into an electrical audio signal. The electrical audio signal is then transmitted to a speaker of audio device 1332, which, in response, generates an acoustic output.

In situations where the bandwidth of distribution infrastructure 1100 is limited and/or variable, playback application 1310 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 1326 is configured to generate frames of video data and transmit the frames of video data to graphics device 1328. In one embodiment, graphics interface 1326 is included as part of an integrated circuit, along with processor 1122. Alternatively, graphics interface 1326 is configured as a hardware accelerator that is distinct from (i.e., is not integrated within) a chipset that includes processor 1122.

Graphics interface 1326 generally represents any type or form of device configured to forward images for display on graphics device 1328. For example, graphics device 1328 is fabricated using liquid crystal display (LCD) technology, cathode-ray technology, and light-emitting diode (LED) display technology (either organic or inorganic). In some embodiments, graphics device 1328 also includes a virtual reality display and/or an augmented reality display. Graphics device 1328 includes any technically feasible means for generating an image for display. In other words, graphics device 1328 generally represents any type or form of device capable of visually displaying information forwarded by graphics interface 1326.

As illustrated in FIG. 13, content player 1120 also includes at least one input device 1336 coupled to communication infrastructure 1302 via input interface 1334. Input device 1336 generally represents any type or form of computing device capable of providing input, either computer or human generated, to content player 1120. Examples of input device 1336 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 1120 also includes a storage device 1340 coupled to communication infrastructure 1302 via a storage interface 1338. Storage device 1340 generally represents any type or form of storage device or medium capable of storing data and/or other computer-readable instructions. For example, storage device 1340 may be a magnetic disk drive, a solid-state drive, an optical disk drive, a flash drive, or the like. Storage interface 1338 generally represents any type or form of interface or device for transferring data between storage device 1340 and other components of content player 1120.

Many other devices or subsystems are included in or connected to content player 1120. Conversely, one or more of the components and devices illustrated in FIG. 13 need not be present to practice the embodiments described and/or illustrated herein. The devices and subsystems referenced above are also interconnected in different ways from that shown in FIG. 13. Content player 1120 is also employed in any number of software, firmware, and/or hardware configurations. For example, one or more of the example embodiments disclosed herein are encoded as a computer program (also referred to as computer software, software applications, computer-readable instructions, or computer control logic) on a computer-readable medium. The term "computer-readable medium," as used herein, refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, etc.), optical-storage media (e.g., Compact Disks (CDs), Digital Video Disks (DVDs), and BLU-RAY disks), electronic-storage media (e.g., solid-state drives and flash media), and other digital storage systems.

A computer-readable medium containing a computer program is loaded into content player 1120. All or a portion of the computer program stored on the computer-readable medium is then stored in memory 1124 and/or storage device 1340. When executed by processor 1122, a computer program loaded into memory 1124 causes processor 1122 to perform and/or be a means for performing the functions of one or more of the example embodiments described and/or illustrated herein. Additionally or alternatively, one or more of the example embodiments described and/or illustrated herein are implemented in firmware and/or hardware. For example, content player 1120 is configured as an Application Specific Integrated Circuit (ASIC) adapted to implement one or more of the example embodiments disclosed herein.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to generate new metadata, use the result of the transformation to apply the metadata, and store the result of the transformation as a smoothed audio sample. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   identifying, within at least one media item that includes a plurality of audio segments, an initial audio segment and a subsequent audio segment that follows the initial audio segment;
   accessing a first set of metadata that corresponds to a last audio frame of the initial audio segment, the first set of metadata including information indicating one or more audio characteristics of the last audio frame of the initial audio segment;
   accessing a second set of metadata that corresponds to the first audio frame of the subsequent audio segment, the second set of metadata including information indicating one or more audio characteristics of the first audio frame of the subsequent audio segment;
   generating, based on the first and second sets of metadata, a new set of metadata that is based on both the audio characteristics of the last audio frame in the initial audio segment and the audio characteristics of the first audio frame in the subsequent audio segment;
   detecting a gap length in time between playback of the initial audio segment and playback of the subsequent audio segment;
   inserting at least one new audio frame between the last audio frame of the initial audio segment and the first audio frame of the subsequent audio segment, wherein the first set of metadata is accessed from header information in audio frames of the initial audio segment, and wherein the inserted audio frames are inserted into the detected gap until subsequent header information from audio frames in the subsequent audio segment is accessed to determine the audio characteristics of the subsequent audio segment; and
   applying the new set of metadata to the at least one new audio frame.

2. The computer-implemented method of claim 1, wherein the initial audio segment and the subsequent audio segment are part of the same media item.

3. The computer-implemented method of claim 2, wherein the media item comprises an interactive media item that allows out-of-order playback of audio segments.

4. The computer-implemented method of claim 3, wherein the subsequent audio segment comprises an out-of-order audio segment within the media item.

5. The computer-implemented method of claim 1, wherein the initial audio segment and the subsequent audio segment are each part of different media items that are being spliced together.

6. The computer-implemented method of claim 1, wherein the generated new set of metadata comprises adaptive metadata configured to adapt to the audio characteristics of the last audio frame in the initial audio segment and to the audio characteristics of the first audio frame in the subsequent audio segment.

7. The computer-implemented method of claim 6, wherein the new audio frame includes at least two subportions over which the audio characteristics of the last audio frame in the initial audio segment are transitioned to the audio characteristics of the first audio frame in the subsequent audio segment using the adaptive metadata.

8. The computer-implemented method of claim 6, wherein the at least one new audio frame comprises at least two new audio frames over which the audio characteristics of the last audio frame in the initial audio segment are transitioned to the audio characteristics of the first audio frame in the subsequent audio segment using the adaptive metadata.

9. The computer-implemented method of claim 6, wherein the adaptive metadata is dynamically inserted into a string of inserted audio frames until the first audio frame of the subsequent audio segment is reached.

10. The computer-implemented method of claim 9, wherein the number of inserted audio frames having adaptive metadata depends on a length of time between playback of the last audio frame in the initial audio segment and the first audio frame in the subsequent audio segment.

11. The computer-implemented method of claim 6, wherein the at least one new audio frame is generated by:
    processing audio stream coding information (ASCI) from known good ASCI into a stored, silent audio frame;
    passing audio frame coding information (AFCI) metadata into the stored, silent audio frame;
    inserting audio block coding information (ABCI) metadata into the stored audio frame;
    padding a zero value into the audio frames to match a frame size determined by a corresponding audio stream bitrate; and
    generating audio error detection or correction codes.

12. A system comprising:
    at least one physical processor; and
    physical memory comprising computer-executable instructions that, when executed by the physical processor, cause the physical processor to:
        identify, within at least one media item that includes a plurality of audio segments, an initial audio segment and a subsequent audio segment that follows the initial audio segment;
        access a first set of metadata that corresponds to a last audio frame of the initial audio segment, the first set of metadata including information indicating one or more audio characteristics of the last audio frame of the initial audio segment;

access a second set of metadata that corresponds to the first audio frame of the subsequent audio segment, the second set of metadata including information indicating one or more audio characteristics of the first audio frame of the subsequent audio segment;

generate, based on the first and second sets of metadata, a new set of metadata that is based on both the audio characteristics of the last audio frame in the initial audio segment and the audio characteristics of the first audio frame in the subsequent audio segment;

detect a gap length in time between playback of the initial audio segment and playback of the subsequent audio segment;

insert at least one new audio frame between the last audio frame of the initial audio segment and the first audio frame of the subsequent audio segment, wherein the first set of metadata is accessed from header information in audio frames of the initial audio segment, and wherein the inserted audio frames are inserted into the detected gap until subsequent header information from audio frames in the subsequent audio segment is accessed to determine the audio characteristics of the subsequent audio segment; and apply the new set of metadata to the at least one new audio frame.

13. The system of claim 12, wherein the initial audio segment and the subsequent audio segment are inserted into a pass-through device.

14. The system of claim 13, wherein the insertion into a pass-through device includes:
copying the first set of metadata into a silent audio frame;
inserting the silent audio frame after the last audio frame of the initial audio segment;
copying the first set of metadata into a pre-encoded user interface audio segment having one or more audio frames;
inserting the pre-encoded user interface audio segment;
inserting the silent audio frame after the inserted pre-encoded user interface audio segment; and
removing a specified number of audio frames from the subsequent audio segment to maintain audio/video synchronization.

15. The system of claim 12, further comprising:
detecting that playback of the initial audio segment or the subsequent audio segment has been directed to stop;
halting playback of the initial audio segment or the subsequent audio segment at a specified position, the initial audio segment or the subsequent audio segment having a current sound pressure level;
appending one or more audio frames to the initial audio segment or the subsequent audio segment after the specified position, wherein the appended audio frames include adaptive metadata that gradually reduces the current sound pressure level to a specified sound pressure level.

16. The system of claim 12, further comprising:
detecting that playback of the initial audio segment or the subsequent audio segment has been directed to start;
initiating playback of the initial audio segment or the subsequent audio segment at a specified position, the initial audio segment or the subsequent audio segment having a current sound pressure level;
inserting one or more audio frames at the specified position before the initial audio segment or the subsequent audio segment are played back, wherein the appended audio frames include adaptive metadata that gradually increases the current sound pressure level to a specified sound pressure level.

17. The system of claim 12, wherein the generated new set of metadata comprises adaptive metadata configured to adapt to the audio characteristics of the last audio frame in the initial audio segment and to the audio characteristics of the first audio frame in the subsequent audio segment.

18. The system of claim 12, further comprising:
calculating a number of audio frames that are to be inserted to fill the detected gap length; and
inserting the calculated number of audio frames between the initial audio segment and the subsequent audio segment.

19. The system of claim 17, wherein the initial audio segment and the subsequent audio segment are each part of different media items that are being spliced together.

20. A non-transitory computer-readable medium comprising one or more computer-executable instructions that, when executed by at least one processor of a computing device, cause the computing device to:
identify, within at least one media item that includes a plurality of audio segments, an initial audio segment and a subsequent audio segment that follows the initial audio segment;
access a first set of metadata that corresponds to a last audio frame of the initial audio segment, the first set of metadata including information indicating one or more audio characteristics of the last audio frame of the initial audio segment;
access a second set of metadata that corresponds to the first audio frame of the subsequent audio segment, the second set of metadata including information indicating one or more audio characteristics of the first audio frame of the subsequent audio segment;
generate, based on the first and second sets of metadata, a new set of metadata that is based on both the audio characteristics of the last audio frame in the initial audio segment and the audio characteristics of the first audio frame in the subsequent audio segment;
detect a gap length in time between playback of the initial audio segment and playback of the subsequent audio segment;
insert at least one new audio frame between the last audio frame of the initial audio segment and the first audio frame of the subsequent audio segment, wherein the first set of metadata is accessed from header information in audio frames of the initial audio segment, and wherein the inserted audio frames are inserted into the detected gap until subsequent header information from audio frames in the subsequent audio segment is accessed to determine the audio characteristics of the subsequent audio segment; and
apply the new set of metadata to the at least one new audio frame.

* * * * *